April 24, 1934. G. F. PERRY 1,956,473
BOLT AND NUT LOCK
Filed July 11, 1933
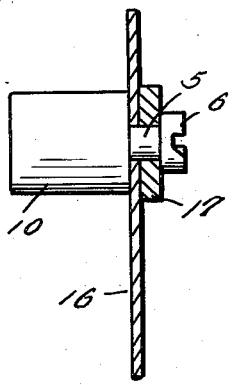
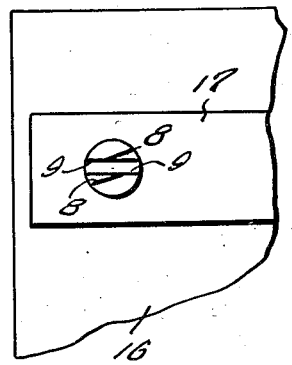
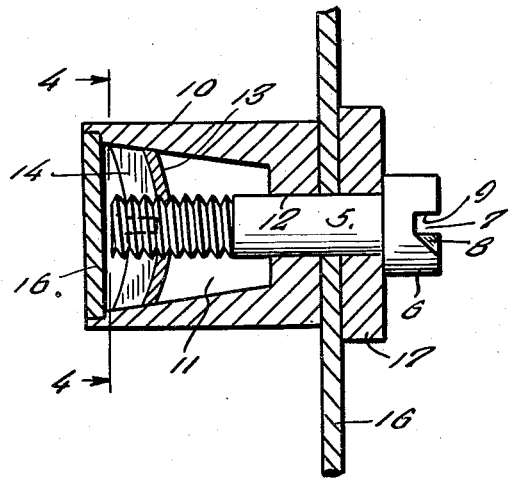
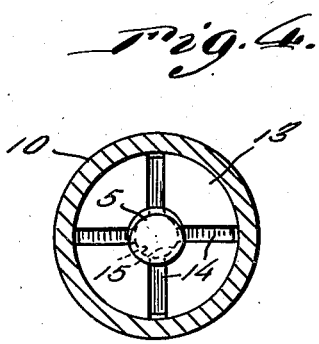
Inventor
George F. Perry
By Clarence A. O'Brien
Attorney Patented Apr. 24, 1934

1,956,473

UNITED STATES PATENT OFFICE 1,956,473

BOLT AND NUT LOCK

George F. Perry, Johnston, S. C., assignor to Joseph W. Cox, Johnston, S. C.

Application July 11, 1933, Serial No. 679,953

2 Claims. (Cl. 151—19)

This invention relates to the class of bolt and nut locking means and has as its primary object the provision of means for securing a bolt and nut means together in such a manner as to prevent a separation thereof without completely destroying the same.

The device in accordance with the present invention is adapted for positively securing a license plate to its bracket to prevent unauthorized removal thereof, and for securing other work in such a manner that the bolt or nut means associated therewith will not become loose nor can they be separated after final application thereof to the work.

The numerous uses to which the device can be put will present themselves to those skilled in the art, and the invention with its objects and advantages will be best understood from a study of the following description taken in connection with the accompanying drawing wherein is illustrated a preferred embodiment of the invention.

It is to be understood at the outset that it is in no wise intended to restrict the invention to the precise details of construction, combination and arrangement of elements as herein illustrated and described, other than may be necessary to meet the requirements of the prior art and the scope of the appended claims.

In the drawing:

Figure 1 is a side elevational view illustrating the application of the device.

Figure 2 is a view at right angles to Figure 1.

Figure 3 is a sectional view through the device taken on an enlarged scale, and

Figure 4 is a sectional view taken substantially on the line 4—4 of Figure 3.

Referring to the drawing by reference numerals it will be seen that the device comprises a bolt 5 having a head 6 provided with a kerf 7 for the reception of a screw driver. The head 6 at opposite sides of the kerf 7, and at the ends of the kerf is beveled as at 8 in a manner to provide on opposite ends of the kerf and on opposite sides thereof shoulders 9 with which the screw driver is engaged when rotating the screw driver in one direction for transmitting movement to the bolt. It will be obvious that upon an attempt to rotate the screw driver in a reverse direction the edge of the screw driver will move over the beveled portion 8 out of the kerf 9 preventing any transmission of movement in a corresponding direction to the bolt 5. The object, intent and purpose of this feature of the invention is to prevent the removal of the bolt 5 through the instrumentality of a screw driver or other similar tool after the device has been once placed in final locking position.

The nut for use in conjunction with the bolt 5 comprises a body member 10 which in the present instance is preferably cylindrical and is provided with a frustro-conical hollow 11, the walls of which are smooth. A hole 12 is provided in the body 10 and extends from the inner end of the hollow 11 to one end of the body 10 as shown. A locking element 13 has a threaded hole therethrough for threaded engagement with the threads of the bolt 5 as shown in Figure 3. The outer peripheral edge of member 13 is beveled in the same direction as the walls of the hollow 11 to engage said walls as shown. To render the member 13, which latter is made of metal or other suitable material, resilient or flexible the same is provided in the concave face thereof with grooves or slits 14, and as shown there are preferably four of such slits 14, providing at the inner ends of said slits teeth 15 adapted to engage between the threads of the bolt 5 and to bite into the bolt 5 in a manner, after the bolt 5 has been screwed home, to prevent relative rotation between the bolt 5 and the member 13.

In assembling the parts 10 and 13, the part or element 13 is arranged within the hollow 11, and within the widest end of the hollow 11 the element 13 is freely rotatable. Subsequent to the placing of the element 13 within the hollow 11 the hollow at the widest open end thereof is closed in any suitable manner preferably through the medium of a metallic disk 16 welded on to the body 11 and thus providing an efficient seal for the hollow 11 to prevent access thereinto.

In actual practice the bolt 5 is passed through the work and then passed through the hole 12 into the body 10 to threadedly engage the element 12. As the bolt 5 is rotated in a clockwise direction the element 13 is gradually worked inwardly toward the smallest end of the hollow 11. As the element 13 moves inwardly towards the smallest end of the hollow 11, element 13 is contracted causing the teeth 15 of the element to bite into the body of the bolt 5 thus locking the element 13 to the bolt 5. After the bolt 5 has thus been screwed home an attempt to rotate the bolt 5 in a reverse direction through the medium of a screw driver or similar tool will be frustrated due to the structure of the head 6 at opposite sides of the kerf 7 as hereinbefore stated. However, in any event, an effort to reversely rotate the bolt 5 be successful it will be apparent that such success will be of no avail for the reason that the element 13 locked to the bolt 5 will turn therewith within the hollow 11 frustrating the attempt to effect a separation of the bolt 5 and element 13 without resorting to such measures as could only result in the utter destruction of the device.

In the drawing the work hereinbefore referred to is illustrated by a license plate, a portion of which is shown in the drawings and indicated by the reference numeral 16 while the bracket for the license plate is also illustrated fragmentarily and indicated by the reference numeral 17. In using the device in this connection the bolt 5 is passed through alined openings in the bracket 17 and plate 16 and the member 10 is arranged on the bolt at the side of the plate 16 opposite to the head 6 of the bolt. With the parts thus assembled the bolt 5 is then rotated in a clockwise direction drawing the element 13 inwardly of the hollow 11 to contract the member 13 for causing a biting engagement of the teeth 15 of the member with the bolt 5 to thereby lock the bolt 5 and member or element 13 together in a manner to preclude relative rotation between the bolt and the member 13; thus insuring a locking of the plate 16 to its bracket 17 against unauthorized removal, and against any removal other than that accomplished by a total destruction of the locking device.

Having thus described my invention, what I claim as new is:—

1. In a device of the character described, a bolt, and nut means for the bolt comprising a substantially cylindrical body having a frustoconical hollow therein, said body having a seal for the hollow at the largest end of the latter and a bolt accommodating opening extending through the body from the smallest end of the hollow and through which opening said bolt extends into the hollow, a relatively thin concavo-convex locking element arrangement in said hollow having a beveled peripheral edge engaging the walls of said hollow, and a central threaded aperture to accommodate the bolt to effect a screw threaded engagement of the bolt with said member, and said member on its concave face being provided with a series of radial grooves providing therebetween at the inner ends of the grooves gripping teeth engaging the bolt for positively locking said member to the bolt when said member is drawn axially of the hollow toward the smallest end of the hollow.

2. In a device of the character described, in combination, a bolt having a threaded end, a member having a substantially sealed frustroconical hollow therein, and an opening in one end of the member through which said bolt is insertible into the hollow and a flexible substantially circular member arrangement in the hollow and having a threaded central aperture for threaded engagement with the bolt and a beveled peripheral edge engaging the walls of the hollow, said flexible member having a substantially circular arrangement of teeth about said opening to bite into the bolt when said member is drawn towards the smallest end of the hollow when the bolt is screwed home.

GEORGE F. PERRY.